United States Patent [19]

Peters

[11] 4,093,152

[45] June 6, 1978

[54] DISC CADDY AND DISC PLAYER SYSTEM THEREFOR

[75] Inventor: Kenneth Donald Peters, Cranbury, N.J.

[73] Assignee: RCA Corporation, New York, N.Y.

[21] Appl. No.: 793,639

[22] Filed: May 4, 1977

[51] Int. Cl.² ............................................. G11B 25/04
[52] U.S. Cl. .................................................. 274/9 R
[58] Field of Search ............ 274/9 R, 13 R, 14, 15 R; 358/128; 360/133

[56] References Cited

U.S. PATENT DOCUMENTS

| | | | |
|---|---|---|---|
| 3,891,796 | 6/1975 | Takahara et al. | 358/128 |
| 3,931,640 | 1/1976 | Takehara et al. | 358/128 X |
| 3,973,273 | 8/1976 | Lissner et al. | 360/133 X |
| 3,981,025 | 9/1976 | Schoettle et al. | 360/133 X |

*Primary Examiner*—Charles E. Phillips
*Attorney, Agent, or Firm*—Eugene M. Whitacre; William H. Meagher; Henry N. Garrana

[57] ABSTRACT

A disc record caddy comprises a pair of substantially flat circular covers releasably held in channels defined along the inside rim of an expandable circular ring. Spring elements bias the ring into a contracted shape to radially restrain a disc retained between the pair of covers. A platform, mounted on a base of a disc record player system, horizontally supports the caddy in an elevated position over a turntable of the system and includes means for expanding the ring to release the covers. A turntable spindle incorporates a lowering-/lifting mechanism which lowers the cover nearest the turntable and the disc supported thereon onto the turntable for record playback purposes, the other cover being retained at the platform level by the radially inward extension of the land defined between the ring channels. At the termination of record playback, the disc and the supporting cover are lifted up to platform level and the ring is allowed to return to the contracted shape thereby enclosing the disc between the two covers. The expanding means and the lowering/lifting mechanism are actuated in response to the movement of a player lid.

6 Claims, 12 Drawing Figures

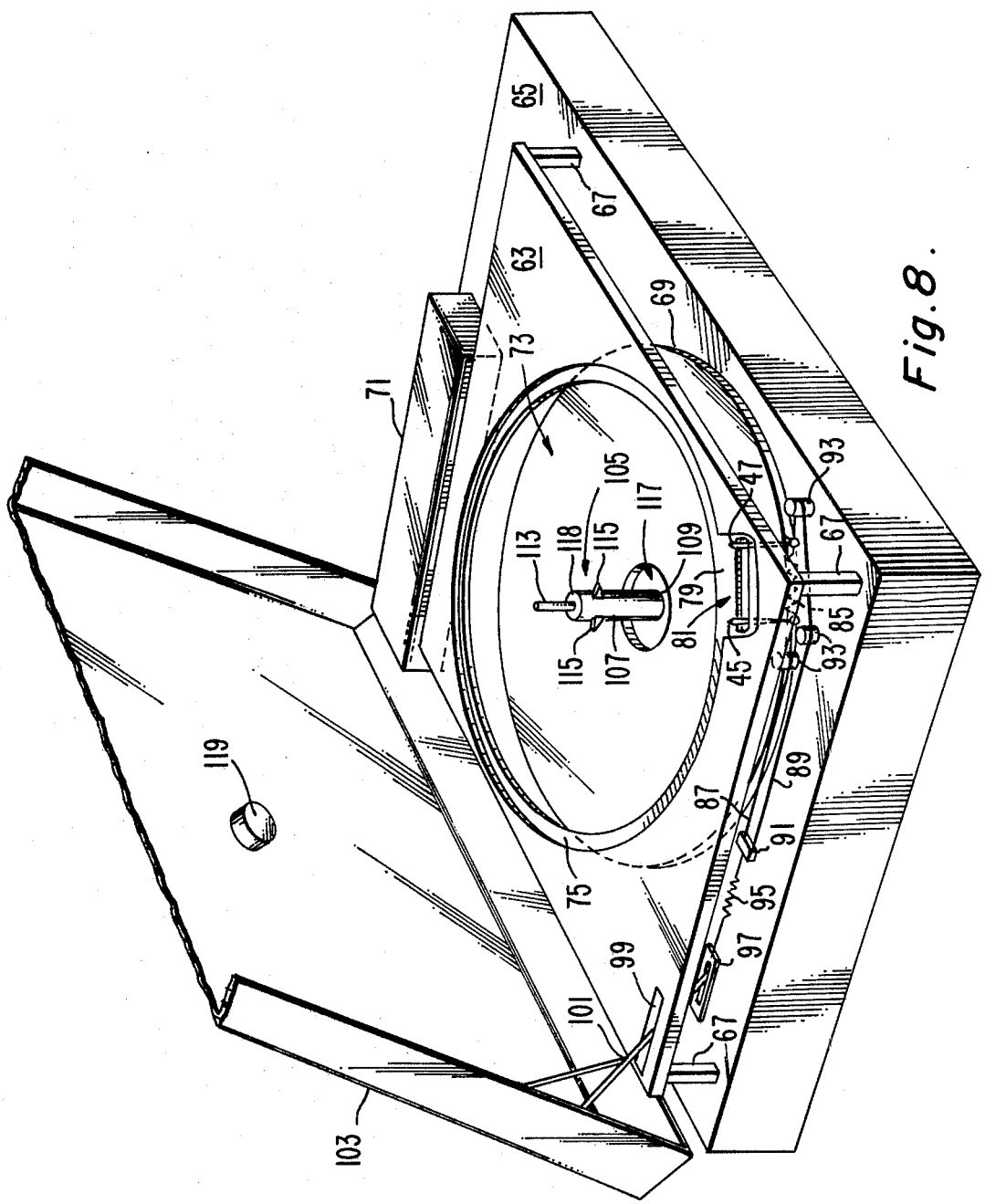

DISC CADDY AND DISC PLAYER SYSTEM THEREFOR

The present invention relates generally to elements of a disc record playback system and particularly to a disc container (hereinafter called "caddy") and disc record player apparatus for mechanically loading and unloading a disc from such a caddy.

In certain sophisticated information recording and playback systems, information is recorded in the bottom of a smooth spiral groove on the surface of a recording medium. High information packing densities in such systems are achieved by having groove densities in the order of four to eight thousand groove convolutions per inch.

One example of such a system is described in U.S. Pat. No. 3,842,194, issued on Oct. 15, 1974, to Jon K. Clemens. Illustratively, the Clemens system employs a disc-shaped recording medium having video and audio information recorded by means of geometric variations in the bottom of a smooth spiral groove on the surface thereof. The groove is coated with a layer of conductive material which, in turn, is coated with a layer of a dielectric material. During record playback, information is recovered from the bottom of the groove by means of a signal pickup electrode supported on a playback stylus mounted at one end of a pickup arm of the player system. The playback stylus engages the spiral groove during playback, and as relative motion is established between the disc and the electrode, an electrode-disc capacitance varies in response to the geometric variations in the bottom of the spiral groove passing beneath the electrode. The capacitance variations are converted to electrical signal variations by a suitable signal processing circuitry coupled to the electrode.

One problem associated with the operation of an information recording and playback system of the above-described type to recover the recorded information is the presence of dust and debris particles in various regions of the disc groove. Playback stylus encounters with such dust and debris particles often result in the deflection of the playback stylus out of engagement with the bottom of the groove leading to momentary distress or loss of information signals. More severe encounters may result in the playback stylus skipping several groove convolutions at a time leading to the loss of a plurality of frames of video information. Dust and debris particles in groove regions may also be responsible for locked groove incidents with the playback stylus retracing the same path. Moreover, these encounters may result in the rapid wear of the disc and the signal pickup electrode (e.g., as the playback stylus lands on the rapidly rotating disc surface after being deflected).

In accordance with the principles of the present invention, alleviation of the problems produced by the dust and debris particles may be had by enclosing the disc record in environmental isolation in a caddy. With release of the disc from the caddy being mechanically accomplished within a record player and re-load of the disc into the caddy at the termination of record playback also being mechanically accomplished within the player, disc exposure to dust and debris particles is significantly reduced.

In further accordance with the principles of the present invention, the caddy is designed to cooperate with a disc player system to permit player access to both sides of a disc record carried therein. Advantageously, player access to the disc and disc reloading into the caddy may be effected via the mechanical movement of a player component (e.g., closing and opening of a player lid) thereby obviating the need for a separate disc loading and reloading activation mechanism.

In an illustrative embodiment of the principles of the present invention, disc record protection from environmental contamination is advantageously realized by a caddy comprising an expandable ring which secures a pair of substantially flat circular covers in spaced-apart relationship to define a cavity in which a disc may be stored. The edges of the covers are respectively received in a pair of channels defined along the inside rim of the ring thereby firmly securing the covers and providing a dust seal along the circumferences of the covers to protect the disc from environmental contaminants and risk of damage during storage, shipping and handling.

In accordance with one aspect of the present invention, a central land defined between the pair of cover-receiving channels extends radially inwardly and serves as a ledge, when the caddy is in a horizontal position, for supporting the upper cover when the ring is expanded to release the lower cover.

An illustrative embodiment of a record player system, in accordance with the present invention, for use with the aforementioned disc caddy includes a platform mounted on a base of the system for horizontally supporting the caddy in an elevated position over a turntable of the system. Means are provided on the platform for expanding the caddy ring to a given expanded shape whereat the covers are released from the ring channels and the upper cover is supported by the central land. The lower cover and the disc supported thereon may be dropped onto the turntable for disc playback purposes. The illustrative embodiment of the player system may further comprise a lowering/lifting mechanism, which serves to gently lower the lower cover and the disc onto the turntable and also serves to lift the lower cover and the disc back to platform level where the disc record may, once again, be enclosed within the caddy.

In one prior art approach to the design of cartridges for storage of discs (e.g., U.S. Pat. No. 2,881,004), a pair of substantially flat circular covers are shown retained in a spaced-apart relationship by a rigid ring and secured thereto by means of manually releasable spring catches provided on the outside rim of the ring. In another prior art approach (e.g, U.S. Pat. No. 2,344,919), a disc carrying case is formed of two semi-circular sections having respective U-shaped slots along the inside rims thereof. Respective ends of the sections are hingedly connected so that the sections may be swung to an open position or to a closed circular position. The respective remote ends of the sections are coupled by means of a clasp for holding the sections in the closed position whereat discs may be retained within the respective U-shaped slots. Semi-circular top and bottom walls may be integrally formed with the respective sections to provide for a completely encosed carrying case.

Both of the aforementioned prior art approaches require manual steps for the release of the disc records from the cartridge. In contrast, the novel structure of the illustrated embodiment of the present invention permits a mechanical release of the disc record from the caddy.

In the accompanying drawings:

FIG. 8 is a perspective view of a disc playback apparatus adapted for the playback of disc records retained in the caddy illustrated in FIG. 1;

Figure 1:
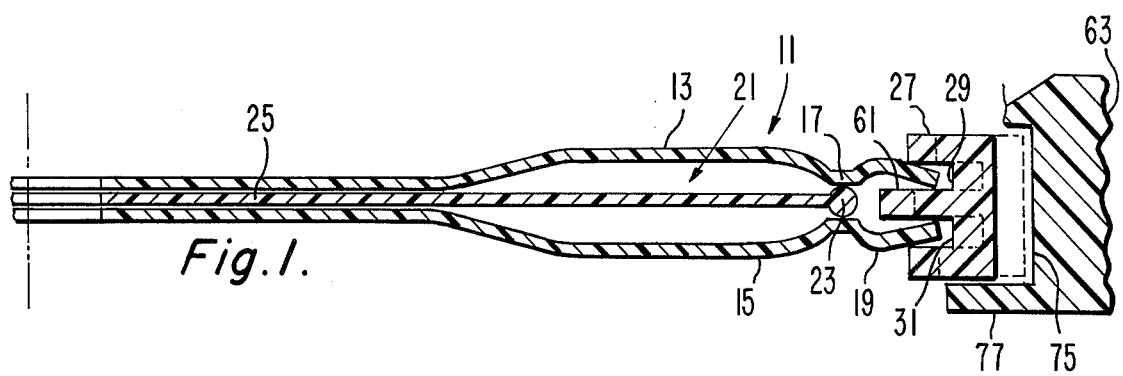
FIG. 1 is a radial sectional view of a disc caddy in accordance with an embodiment of the present invention.
Figure 2:
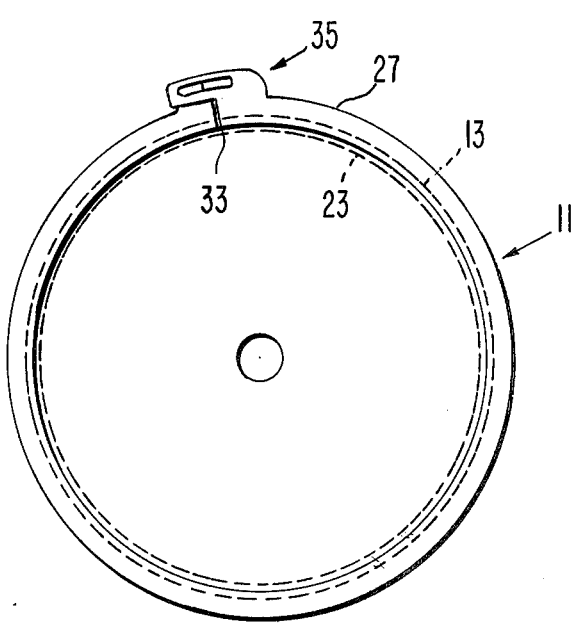
FIG. 2 is a plan view of the caddy of FIG. 1.
Figure 3:
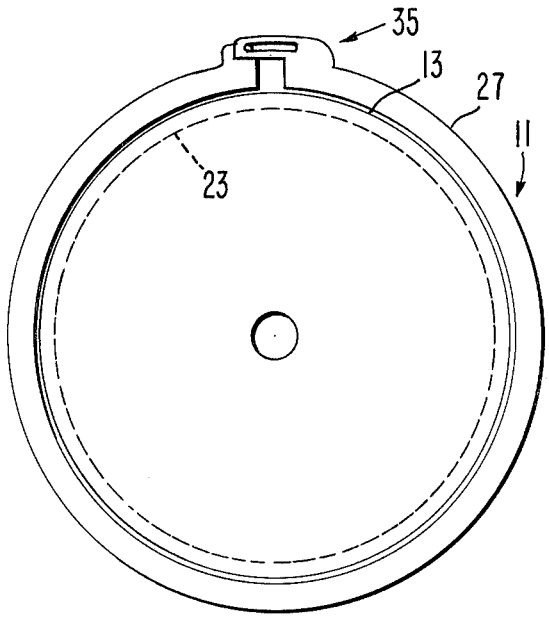
FIG. 3 is a plan view of the caddy of FIG. 1 with the ring thereof in an expanded position.

In FIG. 1 a disc retaining caddy 11 is shown to include a pair of substantially flat, circular covers 13, 15 which may be fabricated of a plastic material, such as high impact polystyrene. The edges of the covers may be shaped as shown at 17, 19 so as not to contact the playing suraces of a disc record 21 disposed therebetween, while providing projecting surfaces which may grip a peripheral bead 23 and a central portion 25 of the disc. A ring 27 is provided with a pair of channels 29, 31 defined along the inside rim thereof into which channels the edges of the covers may be received. As shown in FIGS. 2 and 3, the ring 27 is split, such as 33, and a handle 35, comprising a spring element, latches the end portions of the ring.

It will be appreciated that more than one disc may be retained between the covers of the cartridge by increasing the spacing between the channels 29, 31 to accommodate a plurality of disc records.

Figure 5:
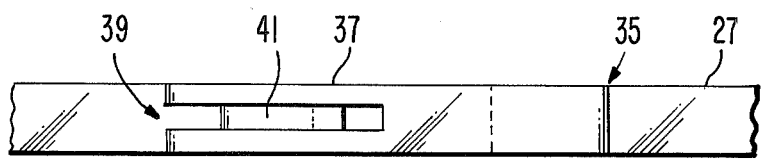
FIG. 5 is a side view of the handle illustrated in FIG. 4.
Figure 4:
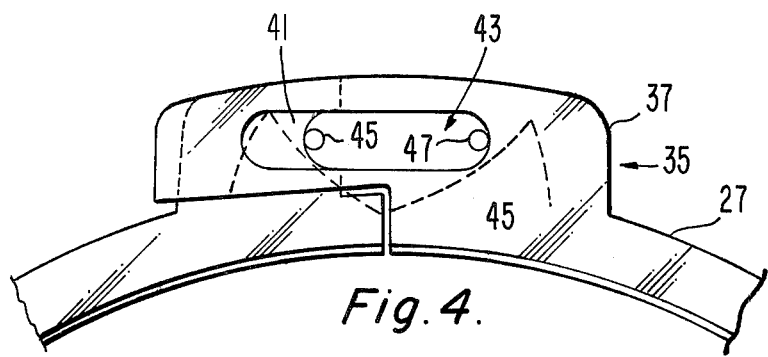
FIG. 4 is a sectional plan view of the caddy of FIG. 1 illustrating one embodiment of a handle provided on the retaining ring.

As more clearly shown in FIGS. 4 and 5, the handle 35 comprises a first member 37 which extends radially outwardly from the outside rim of one end of the split ring 27 and includes two forks which extend along and adjacent to the outside rim of the outer end of the split ring substantially as shown in FIG. 4. The forks define a guideway 39 into which a second member 41, which radially outwardly extends from the outside rim of the outer end of the split ring is slidably received. The radially extending surfaces of the forks respectively include a pair of aligned slots 43 so that when the ring is assembled, a spring element 45 urges the ends of the split ring the one towards the other, with the second member 41 in guideway 39 being visible through the slots 43. The ring 27 may be expanded by inserting a pair of pins 45, 47 through the slots 43 and moving them in opposite directions towards the respective ends of the slots.

Figure 6:
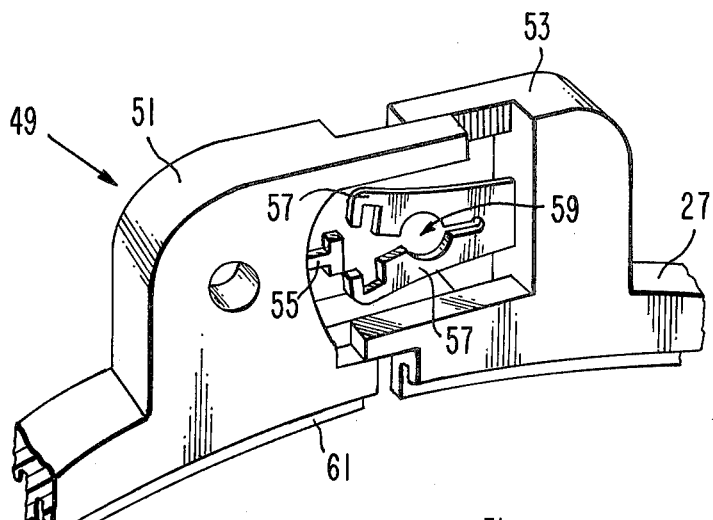
FIG. 6 is a perspective view illustrating another embodiment of a handle with lock means for the caddy of FIG. 1.
Figure 7:
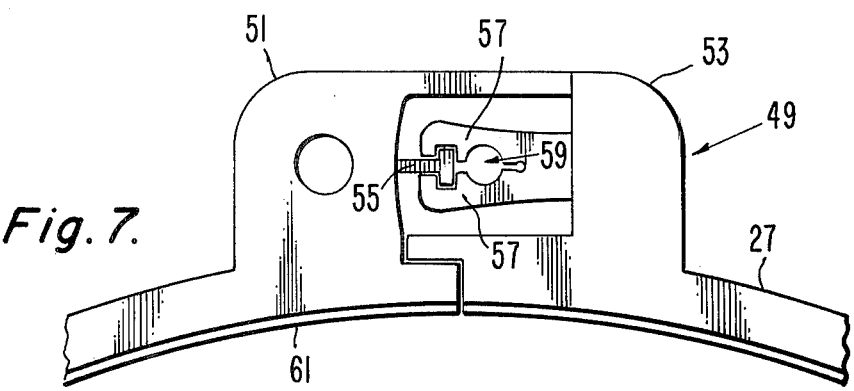
FIG. 7 is a longitudinal, cross-sectional view of the handle illustrated in FIG. 6.

FIGS. 6 and 7 illustrate another embodiment of a handle 49 which obviates the need for any spring element, and therefore simplifies the process of manufacture. In FIG. 6, the handle 49 is shown to comprise two mating U-shaped sections 51, 53 each being integrally formed with the outside rim of a respective end of the ring 27; with the respective openings of the U-shaped sections the one facing the other. The parallel legs of each section are skewed, relative to the respective ends of the ring, in a complementary fashion so that when the ring 27 is contracted, the legs of the U-shaped sections will engage to provide a lateral interlock for the handle 49. Section 51 is provided with a T-shaped member 55 centrally projecting into the cavity thereof, which member 55 cooperates with a pair of normally clamped jaws 57 attached to member 53.

The relative disposition of the parts of handle 49, when the ring is contracted as shown in FIG. 7, enables jaws 57 to latch unto the cross-bar of the T-shaped member 55, thereby securing the ring in the contracted position.

A round aperture 59 near the base of jaws 57 enables the conical end of a rod, having a diameter that is larger than the diameter of aperture 59, when forced through the apertures to move the jaws 57 apart. With appropriate choice of diameter of the rod, the jaws 57 can be moved apart far enough to release T-shaped member 55, thereby permitting expansion of the ring 27.

It will be appreciated that, as the ring is expanded, the covers 13, 15 will ultimately be released from the respective channels 29, 31 and will drop out of the ring. However, the radially inward extension of a land 61 (shown more clearly in FIG. 1) defined between the two channels 29, 31 is chosen such that it defines, at a given expanded position of the ring, an opening which is smaller than the covers. Therefore when the caddy 11 is horizontally positioned and ring 27 is expanded to the given expanded shape, only the bottom cover and the enclosed disc will cover out of the ring under the effect of gravity, the top cover being retained by the central land 61 as shown in the dotted line ring illustration of FIG. 1.

FIG. 8 illustrates a disc record player in accordance with one embodiment of the present invention adapted for reproducing signal information which is recorded on the surface of a disc record carried in a caddy in accordance with the present invention. The disc record player may be generally of a type similar to that described in U.S. Pat. No. 3,870,835, for F. R. Stave.

The player of FIG. 8 is shown to include a platform 63 mounted on a base 65 by means of posts 67. The platform 63 is mounted over a turntable 69 at an elevation chosen to allow a signal pickup carriage 71 to move unobstructed between the turntable and the platform for purposes of disc record playback.

Platform 63 includes a circular opening 73 which may accommodate a disc caddy in accordance with the present invention. A channel 75 is defined along the inside rim of the opening 73, the depth of which channel is sufficient to receive the expanded ring of the caddy. The wall of channel 75 which is nearest the turntable extends radially inwardly of the opening 73 to define a ledge which may support a caddy placed thereon in the manner shown in FIG. 1. The top edge of the opening 73 may be beveled to facilitate reception of a disc caddy on the ledge.

Platform 63 further includes a recessed portion 79 for accommodation of the caddy handle and which recessed portion includes a slot 81 in which a pair of perpendicularly projecting rods or pins 45, 47 are mounted for lateral movement. Pins 45, 47 are spaced apart such that when a disc caddy having a spring coupled handle 35 is positioned on the platform 63 the pins will project through the slots 43 of the caddy handles between members 39, 41, as shown in FIG. 4.

For the player system to be also able to accommodate a caddy having a handle 49 embodying the aforementioned lateral lock concept, pin 45 may be formed with a diameter which will allow sufficient spreading of the jaws 57 to release T-shaped member 55. Pin 47, however, which is to be received in the aperture near the base of the T-shaped member, does not require any modification. Advantageously, both pins 45, 47 should be conically tipped to ease the reception of the pins in the respective apertures.

Figure 9:
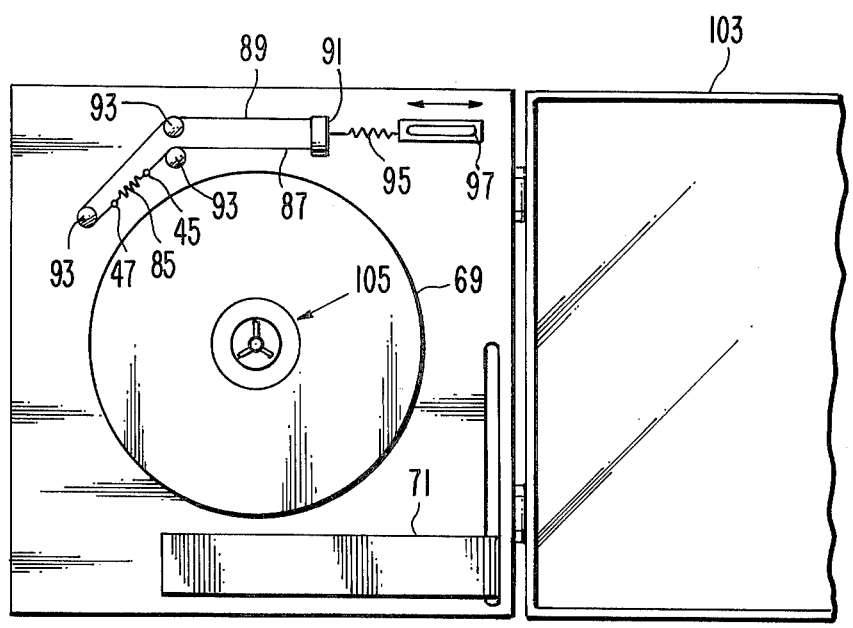
FIG. 9 is a plan view of the player illustrated in FIG. 8 with the platform removed to show details of a ring expanding mechanism.

Pins 45, 47 are urged together by a return spring 85 coupling them at points below the platform 63. As shown more clearly in the plan view of FIG. 9, the pins are also coupled by means of a pair of wires 87, 89, respectively, connecting the pins and a block 91. The wires are passed around respective sheaves 93 arranged such that when the wires are tensioned, the pins are drawn apart. When the tension on the wires is relieved, the pins will be drawn together to their respective original positions by spring 85.

The mechanism for tensioning the wires includes an over-travel spring 95 which is coupled to a link 97 slidably mounted on the bottom of the platform 63 below a slot 99 provided on the platform. The link 97 engages one end of an arm 101 secured to a lid 103 which lid is pivotally mounted on the base 65 for movement between an open position and a closed position covering the base. It will be appreciated that as the lid 103 is moved to the closed position, the arm 101 will travel towards the back end of the base forcing the link 97 to also travel towards the back end of the base and thereby tensioning the wires 87, 89. When the lid is moved to the open position, the arm 101 will travel away from the back end of the base and will therefore relieve the tension force on link 97 and on wires 87, 89.

With a caddy 11 properly supported on platform 63, the handle will be nestled in the recessed portion 79 of the platform with the pins 45, 47 projecting through the handle apertures. It will be appreciated that the positioning of the caddy will force pin 45 through aperture 59 of the handle, when a handle having the aforementioned lock feature is provided thereby spreading the jaws 57 and releasing T-shaped member 55. As the lid 103 is moved to the closed postion, the pins 45, 47 will be drawn apart resulting in the expansion of ring 27 into chanel 75 until further expansion is prevented by the surfaces of the channel. In that given expanded position, the lower cover of the caddy and the disc will drop towards the turntable under the effect of gravity, while the upper cover will be retained at platform level by the radially inward extension of land 61 (as previously discussed with regard to FIG. 1). When the lid 103 is moved to the open position, the pins 45, 47 will be drawn together by spring 85 and the ring 27 will, therefore, also return to its original contracted position. Removal of the cartridge off platform 63 will result in the latching engagement of jaws 57 with T-shaped member 55 when a caddy with a lock handle is utilized.

While it may be adequate for player system design purposes to utilize the available gravitational forces to lower a disc from platform level onto the turntable, it is desirable, to avoid the possibility of disc damage from such a drop, to provide a controlled lowering of the disc. Such a lowering system may be combined with a disc-elevating system for elevating the bottom cover and the disc at the termination of playback, to a level where the disc may be reloaded into the caddy solely by machine operation.

Figure 10:
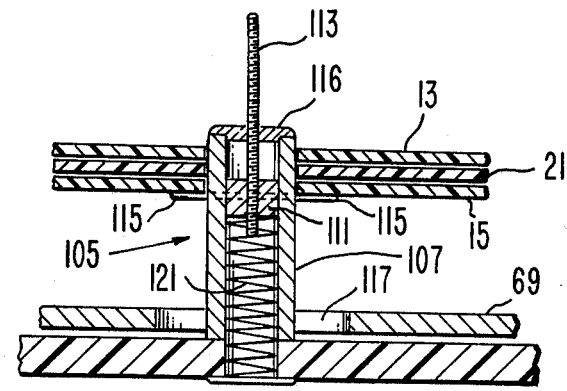
FIGS. 10 and 11 are sectional views of a spindle provided in the player illustrated in FIG. 7, respectively illustrating two different sequences in the operation thereof.
Figure 11:
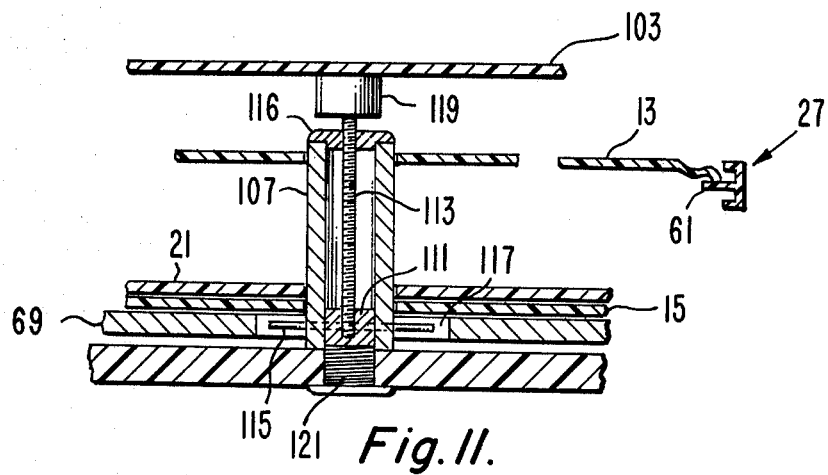

With reference now to FIGS. 8, 10 and 11, a spindle 105 is shown to be perpendicularly mounted on base 65 centrally of the turntable 69. Spindle 105 comprises an upright cylindrical housing 107 having a trio of equally spaced apart longitudinal slots 109, a hub 111 which is slidably received in the cylindrical housing and a shaft 113 which is coaxially supported on the hub. A trio of pins 115, supported on hub 111 laterally project outside of housing 107 through the respective slots 109 while the shaft 113 projects through a central hole in a cover 116 which tops the cylindrical housing 107. The turntable 69 is provided with a central depressed region 117 which is large enough to accommodate the trio of pins 115 so that the hub 111 may be lowered to a level where the pins are below the level of the top surface of the turntable 69.

Shaft 113 cooperates with a boss 119 provided on lid 103 so that when the lid is moved to the closed position, the boss will engage shaft 113 and will depress it thereby lowering the hub 111. When the lid 103 is in the closed postion, the hub 111 will be at a level where the pins 115 are below the top surface of turntable 69, as shown in FIG. 11. Conversely, when the lid 103 is moved to an open position, a coil spring 121 provided in the cylindrical housing 107 upwardly moves hub 111 thus raising the pins 115 to platform level above the turntable as shown in FIG. 10.

In the operation of the player, a caddy 11 is positioned on platform 49 with cylindrical housing 107 projecting through central openings of the disc and covers, as shown in FIG. 1. In that position, the handle portion of the caddy will be nested in the recessed portion 79 of the platform and the pins 115 will engage the lower cover. As the lid is moved to an intermediate position towards the closed position, the ring 27 will be expanded in the manner described above and the caddy covers will be freed with the result that the lower cover 15 and record disc 21 will be supported by pins 115. As the lid is brought to a closed position, boss 119 will engage shaft 113 depressing it towards base 65. This action will result in a gradual lowering of bottom cover 15 and disc 21 onto the turntable surface. It will be appreciated that with lid 103 in the closed position, pins 115 will be below the level of the top surface of thrntable 69, thereby allowing lower cover 15 and disc 21 to be soley supported by turntable 69 for record disc playback purposes as shown in FIG. 11.

Pursuant to an approach explained in U.S. Pat. No. 3,930,653, entitled, "Lid Latch Mechanism For A Disc Record Player," for Larry Dean Huff, the lid cannot be conventionally opened until the signal pickup carriage returns to its rest position off the turntable. However, once the signal pickup carriage is at the rest position, the lid 103 may be opened with the resultant disengagement of the boss 119 and shaft 113. Under the force of spring 121, hub 111 will be upwardly moved and pins 115 will engage the lower cover 15, and raise it and the disc 21 to a position substantially corresponding to their original positions with respect to platform 63 prior to ring expansion. When the lid is further moved to an intermediate position towards the open position, the actuation of the ring expansion mechanism will cease resulting in the return of the ring to its original contracted shape enclosing the disc 21 between the covers 13, 15.

Figure 12:
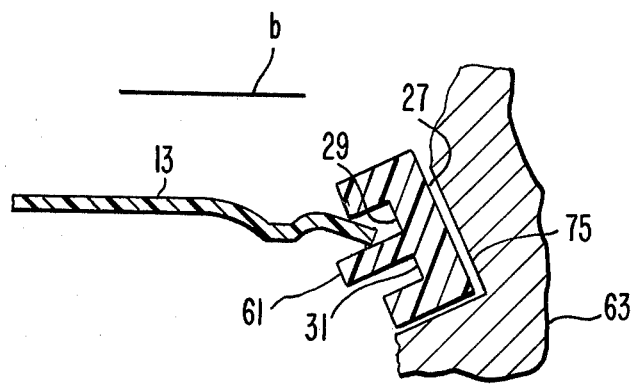
FIG. 12 is a sectional view of an embodiment of a ring channel which may be provided on the platform of the player illustrated in FIG. 8.

In another embodiment for the platform in the player of the present invention, illustrated in FIG. 12, the channel 75 provided in platform 63 is angularly disposed with respect to the plane of base 65, represented in FIG. 12 by line *b*. This disposition of the channel has the effect, when a platform-supported caddy ring 27 is expanded, of tilting the expanded ring such that the top cover 13 will remain held in its respective slot 29 by the ring 27 even though the bottom cover 15 is released.

What is claimed is:

1. In a disc record player, including a turntable rotatably mounted on a base, for use with a record-enclosing caddy having a pair of substantially flat covers, with peripheries releasably held by an expandable ring in respective channels in the inner rim of said ring which are disposed on opposite sides of an inwardly-projecting central land of the ring; apparatus comprising the combination:
    means, mounted on said base and including a ring-engaging platform, for supporting a caddy in a position over said turntable whereat the covers thereof are substantially parallel to said turntable;
    first selectively actuated means for expanding the circumference of a platform-engaged caddy ring to an expanded shape permitting channel release of the lowermost of the covers held by said platform-engaged ring, while maintaining support of the uppermost of said covers on the central land of said ring; and
    second selectively actuated means, subject to engagement with the released cover, for lifting said released cover off said turntable and returning it to plaftform level.

2. Apparatus as defined in claim 1 also including a lid subject to movement between an open position and a closed position covering said base, and wherein said first and second selectively actuated means are actuated in response to movements of said lid between said positions.

3. Apparatus as defined in claim 1 wherein:
    said platform is provided with a recessed circular area for caddy reception, which recessed area includes a central opening dimensioned to permit passage of a caddy cover therethrough while precluding passage of a caddy ring.

4. Apparatus as defined in claim 1 wherein said second selectively actuated means includes means for lowering said released cover into engagement with said turntable.

5. Apparatus as defined in claim 1, also including a lid for said player subject to opening and closing movements, and wherein said expanding means comprises a pair of elongated pins mounted on said supporting means for lateral movement; and means for moving said pair of pins in laterally opposite directions in response to a closing movement of said lid.

6. Apparatus as defined in claim 1 wherein said lifting means comprises a cylindrical housing uprightly supported centrally of the turntable, a hub supported within said housng for slidable movement, a plurality of arms supported on said hub and laterally projecting through longitudinal slots in said housing, and coil spring means for upwardly urging said hub.

* * * * *